(12) United States Patent
Benson et al.

(10) Patent No.: US 6,873,995 B2
(45) Date of Patent: Mar. 29, 2005

(54) METHOD, SYSTEM, AND PROGRAM PRODUCT FOR TRANSACTION MANAGEMENT IN A DISTRIBUTED CONTENT MANAGEMENT APPLICATION

(75) Inventors: Donald Edward Benson, Erie, PA (US); Karen W. Brannon, Palo Alto, CA (US); David Mun-Hien Choy, Los Altos, CA (US); Gerald R. Clarke, Cary, NC (US); Edward Joseph Gallagher, San Jose, CA (US); Hui-I Hsiao, Saratoga, CA (US); Tawei Hu, San Jose, CA (US); Gerald Edward Kozina, Cupertino, CA (US); Matthew R. Laue, San Jose, CA (US); Lily Liang, San Jose, CA (US); Kenneth Carlin Nelson, Hollister, CA (US); Deb Sudipta, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 487 days.

(21) Appl. No.: 10/128,857

(22) Filed: Apr. 23, 2002

(65) Prior Publication Data

US 2003/0200212 A1 Oct. 23, 2003

(51) Int. Cl.[7] ............................................... G06F 17/30
(52) U.S. Cl. ............................... 707/103 R; 707/104.1; 707/10
(58) Field of Search ........................ 707/103 R, 104.1, 707/100, 102; 718/101; 709/225, 201

(56) References Cited

U.S. PATENT DOCUMENTS

| | | | |
|---|---|---|---|
| 5,684,984 A | 11/1997 | Jones et al. | 395/610 |
| 5,950,214 A | 9/1999 | Rivette et al. | 707/512 |
| 6,052,670 A | 4/2000 | Johnson | 705/27 |
| 6,101,527 A * | 8/2000 | Lejeune et al. | 709/201 |
| 2003/0088877 A1 * | 5/2003 | Loveman et al. | 725/92 |

* cited by examiner

Primary Examiner—Charles Rones
Assistant Examiner—Neveen Abel-Jalil
(74) Attorney, Agent, or Firm—Karna J. Nisewaner (57) ABSTRACT

Managing a content management system. The content management system is one that is configured and controlled to establish a connection between a client and a library server, generate a transaction identifier and insert, a record for the transaction in a tracking table associated with the library server, pass transaction data from the client to a resource manager, process the transaction at the resource manager and record transaction data in a tracking table associated with the resource manager. The resource manager returns transaction success/failure data to the client, compares activity recorded in the tracking tables, and takes corrective action based upon the activity comparison.

15 Claims, 4 Drawing Sheets

```
            LIBRARY SERVER TRACKING TABLE
CREATE TABLE ICMSTTXLT
    (
    EXPIRETIME TIMESTAMP,
    TXID TIMESTAMP,
    TXSTATUS SMALLINT NOT NULL,   // 0=In progress, 1=committed
    RMIDS VARCHAR (256)
    )
    IN...
;
```

THE SQL CREATE TABLE FOR THE LS TRACKING TABLE

FIG. 3

RESOURCE MANAGER TRACKING TABLE

```
CREATE TABLE RMTRACKING(
TT_LIBRARYID      SMALLINT        NOT null,
TT_ITEMID         CHAR(26)        NOT null,
TT_VERSION        SMALLINT        NOT null WITH DEFAULT 1,
TT_COLLID         INTEGER         NOT null,
TT_TMP_ITEMID     CHAR(26)        NOT null,
TT_TXID           TIMESTAMP       NOT null,
TT_TS             TIMESTAMP       NOT null WITH DEFAULT    CURRENT TIMESTAMP,
TT_STATUS         CHAR(1)         NOT null,
TT_ACTION         CHAR(1)         NOT null,
TT_OBJECTNAME     VARCHAR(128)    NOT null,
TT_RESOURCEFLAG   SMALLINT        NOT null,
TT_RESOURCELGTH   DOUBLE          NOT null,
TT_MEDIADURSECS   INTEGER         NULL,
TT_MEDIABITRATE   INTEGER         NULL,
TT_MEDIACOPYRATE  INTEGER         NULL,

PRIMARY KEY (TT_LIBRARYID,TT_ITEMID,TT_VERSION,TT_COLLID,TT_TMP_ITEMID))
```

SQL CREATE TABLE STATEMENT FOR THE RM TRACKING TABLE

METHOD, SYSTEM, AND PROGRAM PRODUCT FOR TRANSACTION MANAGEMENT IN A DISTRIBUTED CONTENT MANAGEMENT APPLICATION

FIELD OF THE INVENTION

The invention relates to database management systems and especially to creating and maintaining an index of database contents, and keeping the database index in synchronization with the database contents.

BACKGROUND OF THE INVENTION

Content Management is an infrastructure to manage the full spectrum of digital information. Large collections of scanned images, facsimiles, electronic office documents, XML and HTML files, computer output, audio, video, multimedia, and virtual reality content can be stored and accessed through the content management system. The content management system integrates content with line of business, customer service, ERP, digital asset management, distance learning, Web content management or other applications to accelerate benefits across the enterprise.

In one embodiment the content manager product may be visualized as a triangle, its three vertices being the client, a library server and an object server (resource manager). The client is the user's interface which gives the user the capability of storing, searching for, and, marking-up documents (or to use the more general term, objects). The library server is the equivalent of a card catalog which holds information about the objects, including their location. The object server (OS), also referred to herein as the resource manager (RM) is where either the actual object or a pointer to the actual object is stored.

The core Library Server logic (except for system utilities and housekeeping tasks) is packaged as a set of relational data base (RDB) stored procedures (SPs) containing embedded SQL statements. Each stored procedure (SP) is precompiled and runs on a relational database (RDB) server. Thus each Library Server (LS) process is merely a relational database (RDB) server process. The interface to a Library Server is SQL, through which either stored procedures (SPs) can be called or SQL SELECT statements (including cursor support) can be executed. Remote access to Library Server is via a relational database (RDB) client.

The Resource Managers (RMs) may support different/multiple access protocols. The resource manager (RM)—object server (OS) supports the HTTP protocol.

The basic information entities managed by the Library Server are "items." "Items" as used herein come in two types, simple items and resource items. Resource items can have content associated with them that is stored in one or more Resource Managers. Resource items point to their content via Resource URL-RELATED DATA. One attribute of "items" is their version. Versioning is managed by the library server on individual items. Therefore a resource manager handles different versions of a resource as a different resource.

The library server (LS) and object server (OS) (resource manager (RM)) are separate processes, often running on different machines. In operation, clients first contact the library server (LS) to create/update an index for an object, and to determine where the object is to be stored/replaced. The client then sends a request to the object server (OS) to store/replace the object. It is possible that backing-out updates to one does not mean a successful back-out of updates to the other, and one problem encountered in content management is maintaining consistency between the library server and the resource manager. Maintaining consistency requires linking object metadata stored in the library server to objects stored in a resource manager. When storing or updating objects, problems may arise which cause the library server's catalog to be out of synch with the object server's objects. A method is needed to recover from an out-of-synch condition, for example, to identify when abends have occurred which result in out-of-synch conditions, and then remedy the situation by manually rolling back updates when necessary. An abend may occur after an object has been stored, but before library server updates are committed.

SUMMARY OF THE INVENTION

One problem encountered in content management is maintaining consistency between the library server and the resource manager. The method, system, and program product of the invention maintains the consistency of data between the library server and the resource manager.

The method, system, and program product of the invention manage a content management system. The content management system is one that is configured and controlled to establish a connection between a client and a library server, generate a transaction identifier and insert a record for the transaction in a tracking table (TT) associated with the library server, pass transaction data from the client to a resource manager, process the transaction at the resource manager and record transaction data in a tracking table associated with the resource manager. The resource manager returns transaction success/failure data to the client, compares activity recorded in the tracking tables, and takes corrective action based upon the activity comparison.

According to the invention, when an object and its corresponding resource manager tracking table record have no corresponding library server item, the method further includes rolling back the resource manager store, and deleting both the object and the resource manager tracking table record.

A further aspect of the invention is checking out an item, for example to edit the item, modify the item, or append to the item. This also involves inserting a record for the transaction in a tracking table associated with the library server, passing transaction data from the client to a resource manager, processing the transaction at the resource manager, transferring the requested item to the client, processing the requested item at the client and returning the item to the resource manager, recording transaction data in a tracking table associated with the resource manager, and returning transaction success/failure data to the client, with the step of comparing activity recorded in the tracking tables, and taking corrective action based upon the activity comparison. This action can be rolling back resource manager entries or leaving updated LS meta data as is, and deleting the resource tracking table records.

THE FIGURES

FIG. 4 is a flow chart illustrating the transaction reconciliation process.

DESCRIPTION OR THE INVENTION

This invention relates to content management, including content management systems and methods. More particularly, the invention relates to asynchronous recovery from errors. Asynchronous recovery involves the use of tracking tables for both the library server and object server in an asynchronous process which uses the tracking table information to compare activity on both servers (the library server and the resource manager/object server) to determine when problems have occurred, to define the problems, and then to take corrective action.

A content manager (CM) transaction is a user-determined, recoverable, unit of work, consisting of a sequence of consecutive API calls made through a single connection to a library server (LS). When a transaction ends, the entire transaction is either committed or rolled back. If it is committed, all the content manager (CM) server changes made by API calls within the transaction are made permanent. If a transaction is rolled back or failed, all the changes made within the transaction are reversed (after recovery is performed). An error return from an API call does not imply a failed transaction, only a failed API call. Transaction commit is controlled by application, whereas transaction rollback may be initiated by application or by content manager (CM) (due to a severe error or a relational database (RDB) rollback to resolve a deadlock). Within a transaction, uncommitted resource manager (RM) changes may or may not be visible to the application that made the changes. (This behavior deviates from that of a conventional relational database (RDB) transaction, where uncommitted relational database (RDB) changes are visible to the application that made the changes. To support such relational database (RDB) transaction semantics for resource manager (RM) would significantly increase processing overhead.)

When concurrent or overlapping transactions through a single library server (LS) connection are not supported. Thus, to maintain concurrent transactions, multiple library server (LS) DB2 connections (and thus multiple clients or client processes/threads) are needed. Such function (management of processes, connections, and sessions) are often handled by an application server. On a library server (LS)s, since each library server (LS) process (except for certain content manager (CM) housekeeping and system utility processes) is merely a relational database (RDB) server process, a content manager (CM) transaction maps conveniently to a relational database (RDB) transaction so that RDB's transactional capabilities (locking, logging, commit, abort, recovery) are utilized to support library server (LS) updates. Secondly, if a Client node or library server (LS) failed before a content manager (CM) transaction is committed, relational database (RDB) recovery will roll back the transaction on LS. Thirdly, updates to any non-CM table created in the library server (LS) database can easily be included in a content manager (CM) transaction by application. On a resource manager (RM), however, a native transactional capability is not required or assumed, but is utilized if it is available (e.g., OAM on S/390), content manager (CM) provides synchronization logic to assure data consistency between a library server (LS) and its resource managers (RMs). Described below, this logic uses an asynchronous recovery technique, with the library server (LS) serving as commit coordinator, to accomplish the effect of two-phase commit. This customized protocol for synchronizing content manager (CM) servers is more efficient than a formal two-phase-commit protocol such as XA, is simpler to implement, and does not prerequisite a XA Transaction Manager to run CM. On the other hand, this approach does not preclude configuring the content manager (CM) servers (LS and its resource manager (RM) s) collectively as a single XA Resource Manager if XA compliance is required in the future to synchronize updates to content manager (CM) and non-CM resources.

The scope of a transaction is controlled by Client API call. A transaction must be explicit, i.e., it must be delineated by content manager (CM) API calls made by the client. An explicit transaction starts with an explicit Begin transaction( ) call and ends with an explicit End Transaction( ) call. All the API calls made in-between are included in the transaction scope.

Figure 1:
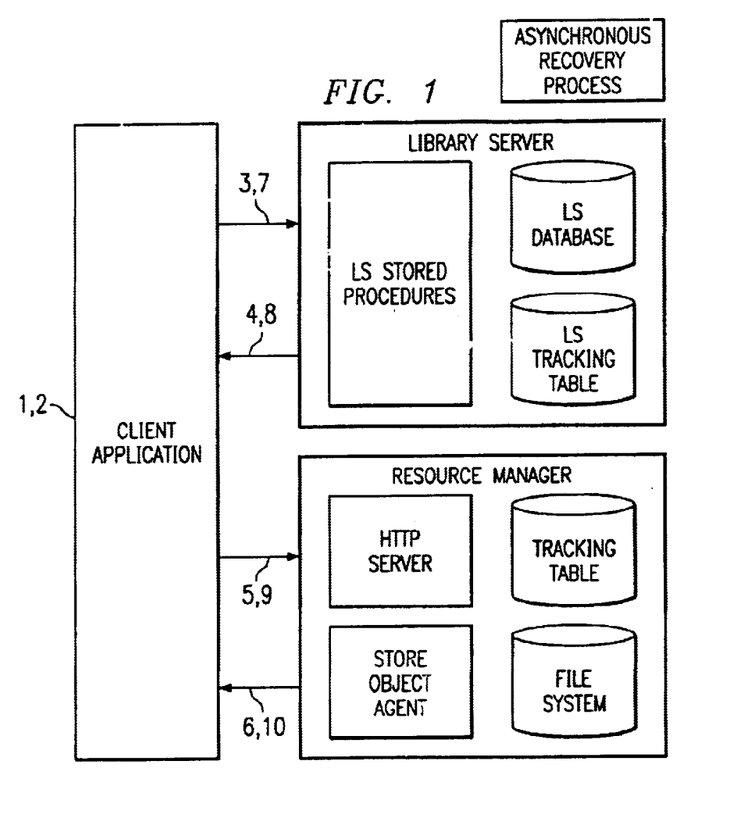
FIG. 1 is an overview of the three elements of the system, the client application, the library server, and the resource manager, and the actions between them in storing and replacing an item.

FIG. 1 illustrates the client, the library server, and the resource server, how they interact to store an item, and when tracking tables are used to indicate when a problem has occurred during the storing/updating of an object. As shown in the FIGURE, a client application, a library server, and a resource manager are running. The library server includes library server stored procedures, a library server database, and a library server tracking table. The resource manager includes an HTTP server, a Content Management resource manager "Store Object" agent, a resource manager tracking table data base, and a file system.

At a high level, the client begins a transaction, 1, and returns confirmation to the caller, 2. Next, the client establishes a connection to the library server, and sends requests to the library server to create a catalog entry (as an index entry) and a place holder for storing or replacing a content management object and setting a "transaction in progress" flag for storing or replacing the object, 3. Storing the placeholder is "committed" by a stored procedure in the library server. In response, the client receives information back from the library server as to where to store the object, as well as an item identifier, a version identifier, and other resource manager information, 4. The client then sends a request to the resource manager to store the object, 5. The client receives a response, 6, from the resource manager with object metadata. This metadata includes, by way of exemplification, the object name, size, and creation timestamp. The client sends this metadata to the library server and populates the various rows involved in the transaction, 7. The library server replies to the client indicating success or failure of the of the metadata update, 8, at which point the client commits the library server updates, 9. After committing the library server updates, the client requests the resource manager to delete its tracking table record. The client receives a reply from the resource manager indicating success or failure in deleting the tracking table entry, 10.

This particular illustrated process has the following possible failure points:

Replace Object #1—If a failure occurs after the library server (LS) commit in step 3, but prior to the resource manager (RM) commit in step 5, a condition will exist where an item has been checked-out in the library server (LS) database by the ICMGetItem API, but for which no replace was done by the resource manager (RM). The asynchronous recovery (AR) cannot assume a failure has occurred in this scenario. The client application may still be in the process of modifying the object, and may not be ready to replace the object yet. Therefore, the asynchronous recovery (AR) can take no action except to write a message to the log indicating that this condition exists.

Replace Object #2—If a failure occurs after the resource manager (RM) commit in step 5, but prior to the library server (LS) commit in step 7, a condition will exist where the object has been replaced by the resource manager (RM), but the LS's meta data does not reflect the update. The asynchronous recovery (AR) will find an resource manager (RM) tracking table "post replace" record(s), but no corresponding library server (LS) tracking table record. Using the timestamp of the resource manager (RM) tracking table record, it will determine a failure has occurred. It will roll-back the resource manager (RM) replace using the data in the resource manager (RM) tracking table record and the saved old object. It will write a message to the log indicating it took this action.

Replace Object #3—If a failure occurs after the library server (LS) commit in step 7, but before the resource manager (RM) tracking table records are deleted/committed in step 9, a condition will exist where the library server (LS) meta data has been updated and committed, an library server (LS) tracking table record exists, the object has been replaced, the item is checked back in, and the resource manager (RM) tracking table record still shows the replace is in progress. The asynchronous recovery (AR) will assume a failure has occurred based upon the time which has passed since the resource manager (RM) tracking table record's timstamp. In this case, the asynchronous recovery (AR) will see leave the library server (LS) meta data as is, and delete the resource manager (RM) tracking table records, and the saved old objects. It will write a message to the log indicating it took this action.

As part of the invention, an asynchronous recovery process runs throughout this process to determine if any failures have occurred, and, if so, to take corrective action. The Asynchronous Recovery (AR) executables have one major purpose; to restore data consistency between a Library Server and its Resource Managers. The asynchronous recovery executables will rollback actions performed within the scope of a transaction when failures occur. Also, actions which can be delayed until later (such as deleting the object for a deleted item) are offloaded to this asynchronous executable in order to improve performance of client applications.

The asynchronous recovery process also performs various reconciliation tasks. The first part of reconciliation is determining "points of failure." For example, a client which is delimiting a unit of work involving the update of new or existing objects may fail before the Library Server updates are committed. If so, these updates will be automatically rolled-back by the RDB. However, updates performed by the Resource Manager must be rolled-back later by the asynchronous recovery process. Another "end of task" task is cleaning up library server and resource manager tracking tables. The asynchronous recovery process will delete tracking table records (for both the library server (LS) and resource manager (RM)) for transactions which are determined to have completed successfully.

Deletes are initiated by a client, which invokes the appropriate API, which in turn, invokes a Delete Item stored procedure. The Delete Item stored procedure will delete the item, then (for resource items) insert a record into the "to be deleted" table, and commit. It is the responsibility of the Resource Manager to asynchronously obtain the list of objects to be deleted from a "to de deleted" table. The Resource Manager will then delete each object, as well as any resource manager (RM) specific features references to the object (i.e., the "prefetched" copy, or replica).

There are two resource manager (RM) asynchronous recovery (AR) executables, transaction reconciliation which is responsible for transaction recovery, and deletion reconciliation which is responsible for object deletion. Both executables may be Java based programs and Java classes with methods, or C/C++ based, with C functions. These programs and methods will be installed with the resource manager.

Figure 2:
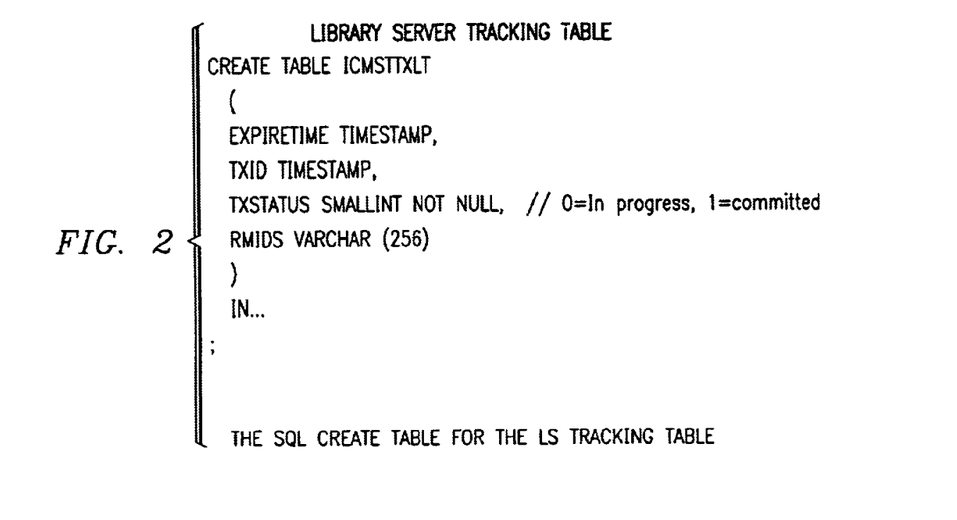
FIG. 2 illustrates the SQL Create Table statements for the Library Server Tracking Table.

The Library Server Tracking Table (LS TT) is created by the SQL command set shown in FIG. 2, and includes two tables organized as a 2-level hierarchy.

1. TxTbl: [TXID (PK), Status ("I" or "C"), CommitTimestamp]—A row with Status="I" is inserted by each (lazy) begin transaction, BEGTRAN. An end transaction, ENDTRAN(commit) changes "I" to "C", sets CommitTimestamp, and commits the relational database transaction on LS. An end transaction, ENDTRAN(rollack) rolls back the relational database transaction, including the record inserted by begin transaction, BEGTRAN.

2. TxRMTbl: [TxID (non-null FK to TxTbl), Rmid]—A row is inserted by end transaction, ENDTRAN (commit) for each RM updated by the respective transaction.

In addition to LSTT, a Completion Threshold is stored in system table for each resource manager, RM. The library server transaction table, LSTT, is internal to the library server. That is, it is not exposed to the resource managers, RMs.

Figure 3:
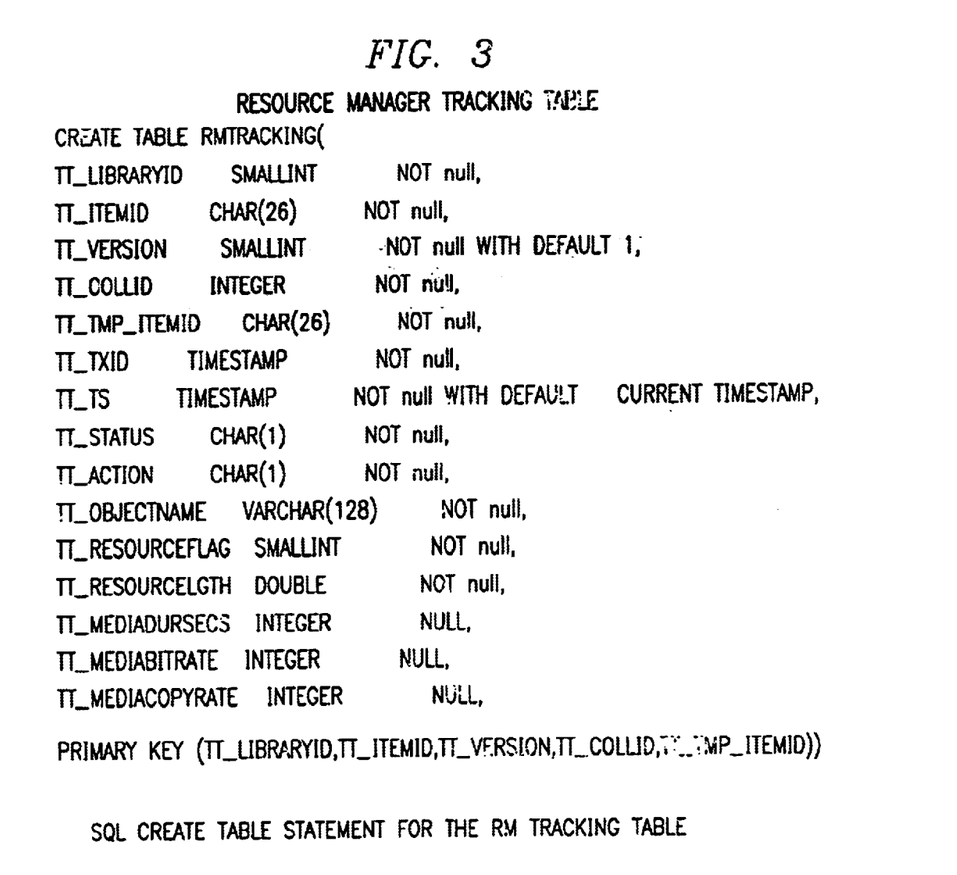
FIG. 3 illustrates the SQL Create Table for the Resource Manager/Object Serve Tracking Table.

The Resource Manager Tracking Table is a table or set of table internal to the respective resource manager (i.e., not exposed to library server (LS) and other resource manager (RM) s). The Resource Manager Tracking Table is used to support local synchronization/recovery among the relational database, file system, and TSM. A resource manager (RM) tracking table (TT), created by the SQL statements in FIG. 3, typically includes Transaction ID, Timestamp, To Do Operation ("store", "replace", "delete", "replicate" (depending on replication design), "sms update"), Status ("I", "C"), Temporary Object ID, and External Object ID, plus operation-specific or platform-specific attributes that may be needed to support local synchronization/recovery. The To Do Operation is an operation to be performed by resource manager (RM) AR, it may or may not match an API operation. For example, "replicate" is an asynchronous recovery (AR) operation, not an API operation. By way of comparison and contrast, the COPYOBJ and MOVEOBJ APIs reuse "replicate" and "delete" records in resource manager (RM) tracking table (TT) and do not use specific To Do Operations corresponding to the APIs.

The following general algorithm, summarized in FIG. 4, illustrates the transaction reconciliation process.

1. Send a completion threshold to library server (LS) to be used for LSTT cleanup.
2. Find the oldest record in resource manager (RM) tracking table (TT) and compute AGE=(current resource manager (RM) time)—(timestamp in oldest resource manager (RM) tracking table (TT) record).
3. Send AGE to library server (LS) SP.
4. The SP locks the resource manager (RM) Definition system table in order to prevent simultaneous execution of transaction reconciliation. If the table cannot be locked, the SP will return an "already active" return code and the executable/method will end. If the lock is obtained it will remain locked until the entire library server (LS) and resource manager (RM) reconciliation is performed.

5. The SP computes (current library server (LS) time)—(AGE)=(delta) and saves it in the resource manager (RM) definition system table as the completion threshold for this resource manager (RM). Delta is an upper bound for the delay between resource manager (RM) obtaining the current resource manager (RM) time and SP obtaining the current library server (LS) time 6. Determine committed and rolled-back/failed transactions 7. Riding on the above access to LS. Get a list of distinct Transaction IDs from resource manager (RM) tracking table (TT) for transactions whose last operation is older than a small age threshold. (This age threshold does not affect the integrity of the asynchronous recovery (AR) algorithm. It is used to filter out most in-progress transactions so as to reduce unnecessary processing. This list of Transaction IDs is usually not very big since it only contains transactions in which the asynchronous request issued by ENDTRAN did not finish, transactions that failed, and in-progress transactions that escaped the age threshold). If this list is not empty, send it to library server (LS) by calling a SP using a privileged user ID. The SP, running at UR (uncommitted read) isolation level, checks this list against TxTbl and marks each Transaction ID in the list as "committed", "in progress", or "not found" (which means the transaction has been rolled back or failed). It then returns a list of "committed" Transaction IDs and a list of "not found" Transaction IDs to the resource manager (RM).

Clean up the library server (LS) tracking table (TT) for completed transactions. This is a part of the Stored Procedure processing, using completion thresholds stored in library server (LS) system table. Preferably, the stored procedure will:

1. Get the resource manager (RM)'s completion threshold from system table.
2. Delete all records in TxRMTbl that are associated with this resource manager (RM) and are associated with a transaction committed before the completion threshold.
3. Delete from transaction table (TxTbl) all records with Status="C" and without a child record in TxTMTbl.

To complete resource manager (RM) operations for the list of returned committed transactions, the method, system, and program product of the invention carry out the following steps. For each of these Transaction IDs, complete all the operations recorded in resource manager (RM) tracking table (TT) for this transaction. All changes must be made in a recoverable manner, and are cleaned up and committed at the end of this step. Specifically, for each resource manager (RM) tracking table (TT) record containing one of the listed Transaction IDs, do the following:

1. "store": Delete the resource manager (RM) tracking table (TT) record.
2. "replace": Delete the old object and the resource manager (RM) tracking table (TT) record.
3. "delete" If the object is not the source of a pending replication, then delete the object and the resource manager (RM) tracking table (TT) record. Otherwise, skip this resource manager (RM) tracking table (TT) record.
4. "sms update": Commit the SMS change and delete the resource manager (RM) tracking table (TT) record.
5. "replicate": Mark the resource manager (RM) tracking table (TT) record as "committed" (Status="C").

Similarly, to complete resource manager (RM) operations for the list of complete resource manager (RM) operations for the returned list of failed/rolled-back transactions, the following steps are carried out:

1. "store": Delete the stored object and the resource manager (RM) tracking table (TT) record.
2. "replace": Delete the new object and the resource manager (RM) tracking table (TT) record.
3. "delete": Delete the resource manager (RM) tracking table (TT) record.
4. "sms update": Reverse the update and delete the resource manager (RM) tracking table (TT) record.
5. "replicate": Delete the resource manager (RM) tracking table (TT) record. (replication design may not be using resource manager (RM) TT).

The resource manager (RM) asynchronous recovery (AR) Process determines the completion threshold timestamp using the resource manager (RM) tracking table (TT) records The resource manager (RM) asynchronous recovery (AR) Process reads the resource manager (RM) tracking table (TT) to determine the list of Transaction Ids to be passed to the LS. These are records with a timestamp older than a selected interval (say 1 hour). The resource manager (RM) asynchronous recovery (AR) Process invokes the library server (LS) "TRX reconciliation Stored Procedure". The library server (LS) SP locks the resource manager (RM) Definition record and updates the age threshold The library server (LS) "AR Stored Procedure" reads the library server (LS) tracking table (TT) to determine, for each Transaction ID, whether it is committed, in progress, rolled-back or "missing". The library server (LS) "AR Stored Procedure" returns the list of TrxIDs to the resource manager (RM) asynchronous recovery (AR) Process, with their status codes. The resource manager (RM) asynchronous recovery (AR) Process retrieves the resource manager (RM) tracking table (TT) records for the list of completed Transaction IDs returned from the LS. The resource manager (RM) asynchronous recovery (AR) Process completes the updates for the list of completed Transaction IDs returned from the LS. The resource manager (RM) asynchronous recovery (AR) Process retrieves the resource manager (RM) tracking table (TT) records for the list of rolled-back or missing Transaction IDs returned from the LS. The resource manager (RM) asynchronous recovery (AR) Process rolls back the updates for the list of rolled-back or missing Transaction IDs returned from the LS, and then commits the updates. The resource manager (RM) then commits the library server (LS) updates.

Logging—Rollback actions taken by the asynchronous recovery (AR) should be logged. It is generally agreed that the logging for all resource manager (RM)s should be in a central place, such as the library server (LS) database. Log messages would include the data from the tracking table record, and the rollback action taken.

The following summarizes the Content manager (CM) server states to be recovered from, or to be cleaned up, by asynchronous recovery (AR) processes. In general, they involve entries in library server (LS) TT, entries in OS TT, and/or orphan objects in OS.

Store Object #1 Transaction failed or client-initiated rollback All library server (LS) updates rolled back (including library server (LS) tracking table (TT) record) No resource manager (RM) updates have occurred. No action necessary by AR.

Store Object #2 Transaction failed or client-initiated rollback All library server (LS) updates rolled back (including library server (LS) tracking table (TT) record) Object and resource manager (RM) tracking table (TT) record need to be deleted by AR.

Store Object #3 Transaction failed or client-initiated rollback All library server (LS) updates have been committed, meta data update is complete. Object can remain, but resource manager (RM) tracking table (TT) record must be deleted by AR.

Replace Object #1 Transaction failed or client-initiated rollback All library server (LS) updates rolled back (including library server (LS) tracking table (TT) record) No resource manager (RM) updates have occurred. No action necessary by AR.

Replace Object #2 Transaction failed or client-initiated rollback All library server (LS) updates rolled back (including library server (LS) tracking table (TT) record) "New" object and resource manager (RM) tracking table (TT) record need to be deleted by AR.

Replace Object #3 Transaction failed or client-initiated rollback All library server (LS) updates have been committed, meta data update is complete. "New" object can remain, but resource manager (RM) tracking table (T) record and "old" object must be deleted by AR.

Delete Object #1 Transaction failed or client-initiated rollback All library server (LS) updates rolled back (including library server (LS) tracking table (TT) record) No resource manager (RM) updates have occurred. (Deletes are delayed, so no action is necessary by AR.)

Change SMS #1 Transaction failed or client-initiated rollback All library server (LS) updates rolled back (including library server (LS) tracking table (TT) record) No resource manager (RM) updates have occurred. No action necessary by AR.

Change SMS #2 Transaction failed or client-initiated rollback All library server (LS) updates rolled back (including library server (LS) tracking table (TT) record) SMS Info needs to be restored, and resource manager (RM) tracking table (TT) record needs to be deleted by AR.*

Change SMS #3 Transaction failed or client-initiated rollback All library server (LS) updates have been committed, meta data update is complete. SMS Info should be left as is, but resource manager (RM) tracking table (TT) record must be deleted by AR.

Store3rdPartySynch #1 Transaction failed or client-initiated rollback All library server (LS) updates rolled back (including library server (LS) tracking table (TT) record) No resource manager (RM) updates have occurred. No action necessary by AR.

Store3rdPartySynch #2 Transaction failed or client-initialed rollback All library server (LS) updates rolled back (including library server (LS) tracking table (TT) record) Object and resource manager (RM) tracking table (TT) record need to be deleted by AR.

Store3rdPartySynch #3 Transaction failed or client-initiated rollback All library server (LS) updates have been committed, meta data update is complete. Object can remain, but resource manager (RM) tracking table (TT) record must be deleted by AR.

Store3rdPartyAsynch #1 Transaction failed or client-initialed rollback All library server (LS) updates rolled back (including library server (LS) tracking table (TT) record) No resource manager (RM) updates have occurred. No action necessary by AR.

Store3rdPartyAsynch #2 Transaction failed or client-initiated rollback All library server (LS) updates rolled back (including library server (LS) tracking table (TT) record) Object and resource manager (RM) tracking table (TT) record need to be deleted by AR.

Store $3^{rd}$ PartyAsynch #3 Transaction failed or client-initiated rollback All library server (LS) updates have been committed, meta data update is complete. Object can remain, but resource manager (RM) tracking table (TT) record must be deleted by AR.

3-Tier #1 Transaction failed or client-initiated rollback All library server (LS) updates rolled back (including library server (LS) tracking table (TT) record) No resource manager (RM) updates have occurred. No action necessary by AR.

3-Tier #2 Transaction failed or client-initiated rollback All library server (LS) updates rolled back (including library server (LS) tracking table (TT) record) Object and resource manager (RM) tracking table (TT) record need to be deleted by AR.

3-Tier #3 Transaction failed or client-initiated rollback All library server (LS) updates have been committed, meta data update is complete. Object can remain, but resource manager (RM) tracking table (TT) record must be deleted by AR.

3-Tier #4 Transaction failed or client-initiated rollback All library server (LS) updates have been committed, meta data update is complete. Object can remain, but resource manager (RM) tracking table (TT) record must be deleted by AR.

MoveObject #1 Transaction failed or client-initiated rollback All library server (LS) updates rolled back (including library server (LS) tracking table (TT) record) No resource manager (RM) updates have occurred. No action necessary by AR.

Move Object #2 Transaction failed or client-initiated rollback All library server (LS) updates rolled back (including library server (LS) tracking table (TT) record) Object and resource manager (RM) tracking table (TT) record need to be deleted by AR.

MoveObject #3 Transaction failed or client-initiated rollback All library server (LS) updates have been committed, meta data update is complete. Object can remain, but resource manager (RM) tracking table (TT) record must be deleted by AR.

Commits are performed in three steps in the path above; in step 3 after the object has been stored by the resource manager, in step 6 (after the library server metadata update), and in step 7 after the resource manager deletes the tracking table records for the transaction. Failures may occur before or after each of these commit points.

If a failure occurs prior to step 3, any library server database updates which might have been performed will be rolled-back. No resource manager updates will have occurred either. No action is necessary by the asynchronous recovery process.

If a failure occurs after an object(s) has been stored and committed in step 3, but prior to the commit of the library server meta data update in step 6, a condition will exist where an object (and its corresponding tracking table record) have no corresponding library server item (i.e., an "orphaned object"). The asynchronous recovery process will find the resource manager tracking table record and no corresponding library server tracking table record. It will assume the transaction aborted if a to be determined amount of time has passed since the resource manager tracking table record was written, and will roll-back the store, deleting both the object and the resource manager tracking table record.

If a failure occurs after the commit in step 6, but prior to the commit in step 7, the asynchronous recovery process will find both a library server tracking table record and a corresponding resource manager tracking table record(s). It will delete the resource manager tracking table record.

Client-initiated Rollbacks—The points above address out-of-synch conditions occurring as the result of an aborted transaction. However, the client may also initiate a roll-back. In this case, updates to the library server will immediately be rolled back. The object server 'store' action will be rolled-back later by the asynchronous recovery process.

Since each library server (LS) connection is a relational database (RDB) connection, there is a single relational database (RDB) userid associated with a library server (LS) connection and with all the content manager (CM) transactions executed through this connection. On the other hand, each content manager (CM) API call can be associated with a different content manager (CM) userid, which is used by library server (LS) for access control, check-in/check-out, accounting and audit trail. This capability is needed when the Client node is a mid-tier server that accesses content manager (CM) on behalf of many end-users. To accommodate this access paradigm, every content manager (CM) application has an option to set content manager (CM) userid and content manager (CM) password at logon time (if content manager (CM) user is to be authenticated by library server (LS) or by a third party via LS).

To checkout one or more content manager (CM) item(s) for editing, a checkout API can be called, which acquires a persistent write lock on these item(s) to prevent concurrent update by another user. This write lock can span content manager (CM) transactions. That is, a checkout call to lock an item, the subsequent API calls to change the item (or its objects), and finally a checkin call to release the write lock on the item, can be made in separate transactions and even through different connections to the LS. The write lock acquired by checkout on an item does not prevent another user from retrieving the item or retrieving objects belonging to the item. In fact, Get Item( ) and Get Object( ) do not acquire/require a read lock on the item.

A library server (LS)-generated security token that is used to access a resource manager (RM) can also span content manager (CM) transactions, i.e., an application can obtain a token from library server (LS) in one transaction and use it to access a resource manager (RM) in another transaction.

If a content manager (CM) transaction does not make change to any resource manager (RM), then the content manager (CM) transaction can be handled as a relational database (RDB) transaction on a library server (LS). Otherwise, the content manager (CM) has to synchronize resource manager (RM) changes with library server (LS) changes, and be prepared to recover from any possible transaction failure. To do so, a unique Transaction ID is needed to identify each content manager (CM) transaction, and a Tracking Table is maintained on each content manager (CM) server to record hardened but not-yet-committed resource manager (RM) changes and transaction state. Using transaction ids and transaction tables, Asynchronous Recovery (AR) processes can be executed to restore data consistency between a library server (LS) and its resource manager (RM)s in case of a failure. There is an asynchronous recovery (AR) process running on each content manager (CM) server. Each asynchronous recovery (AR) process runs independently. Depending on the environment, an asynchronous recovery (AR) process can be a periodically scheduled task or a continuously running daemon. All asynchronous recovery (AR) processes run at relational database (RDB) "Cursor Stability" isolation level unless specifically stated otherwise. The TTs maintain a sparse and transient log of resource manager (RM) updates for incomplete content manager (CM) transactions. If a content manager (CM) transaction ends successfully (either committed or rolled back), with content manager (CM) servers synchronized for this transaction, no record of this transaction remains in the TTs in a steady state, thereby keeping the TTs small and simplifying housekeeping tasks handled by asynchronous recovery (AR) processes. Transaction ID and TTs are not exposed to application. (There is no apparent use for Transaction ID by an application. Exposing it only creates a problem if a bad Transaction ID is passed in by application.) Rather, Transaction ID is saved in the API Cache for use by subsequent API calls, and is removed from the API Cache when the content manager (CM) transaction ends.

The basic design is as follows. On a library server (LS), each content manager (CM) transaction is supported by a relational database (RDB) transaction, and the library server (LS) tracking table (TT) is used to coordinate content manager (CM) transaction commit/rollback involving OS(s) and to recover from failure. On an OS, all constructive updates (e.g., store object) made by an API call, as well as a log of the updates made (stored in the OS TT), are hardened. However, the metadata updates on the library server (LS) corresponding to these OS updates are deferred to transaction commit time. On the other hand, destructive OS updates (e.g., delete object) are deferred to transaction commit time, but the corresponding metadata updates on the library server (LS) are performed in-line. To roll back OS changes, compensatory operations are performed based on OS tracking table (TT) entries. This approach improves performance and simplifies recovery.

In the description of the API logic flow, potential failure states are identified. These are the states that can possibly be left behind by a failed content manager (CM) transaction (after relational database (RDB) recovery is performed on each failed server) and are therefore the states that asynchronous recovery (AR) processes need to recover from. In addition, there are certain harmless remnant entries that can be left in a tracking table (1T) and that can be cleaned up by asynchronous recovery (AR) processes as well. To recover from failure, an asynchronous recovery (AR) process uses a "presumed abort" protocol, i.e., if a transaction can no longer be detected on the library server (LS) (as reflected by the library server (LS) TT), it is assumed to have been rolled back or failed. Therefore, for an in-progress transaction, some indication of the transaction has to be maintained in the library server (LS) tracking table (TT) before any change is made to a resource manager (RM), and furthermore, such indication has to be maintained until all resource manager (RM) changes are committed and all OS tracking table (TT) entries for the transaction are deleted. Otherwise, the transaction state is indistinguishable from that of a failed transaction, and an asynchronous recovery (AR) process might erroneously roll back fresh resource manager (RM) changes before the transaction is committed.

The process to delete objects is as shown in FIG. 4.3, which is another overview of the three elements of the system, the client application, the library server, and the resource manager, and the actions between them in retrieving an item.

Using a library server (LS) SP, get a list of objects that are to be deleted from the library server (LS) using only committed records in the "to be deleted table. The resource manager checks if any of these objects still exist, and if so, it has an option to delete them synchronously or asynchronously. Object deletion implementation is unique to the resource manager (RM). For LBOS the object will be marked for deletion and deleted asynchronously by the migrator. For HBOS it is simpler to delete the object synchronously here. In either case, the changes are made in a recoverable manner and are cleaned up and hardened at the end.)

Figure 5:
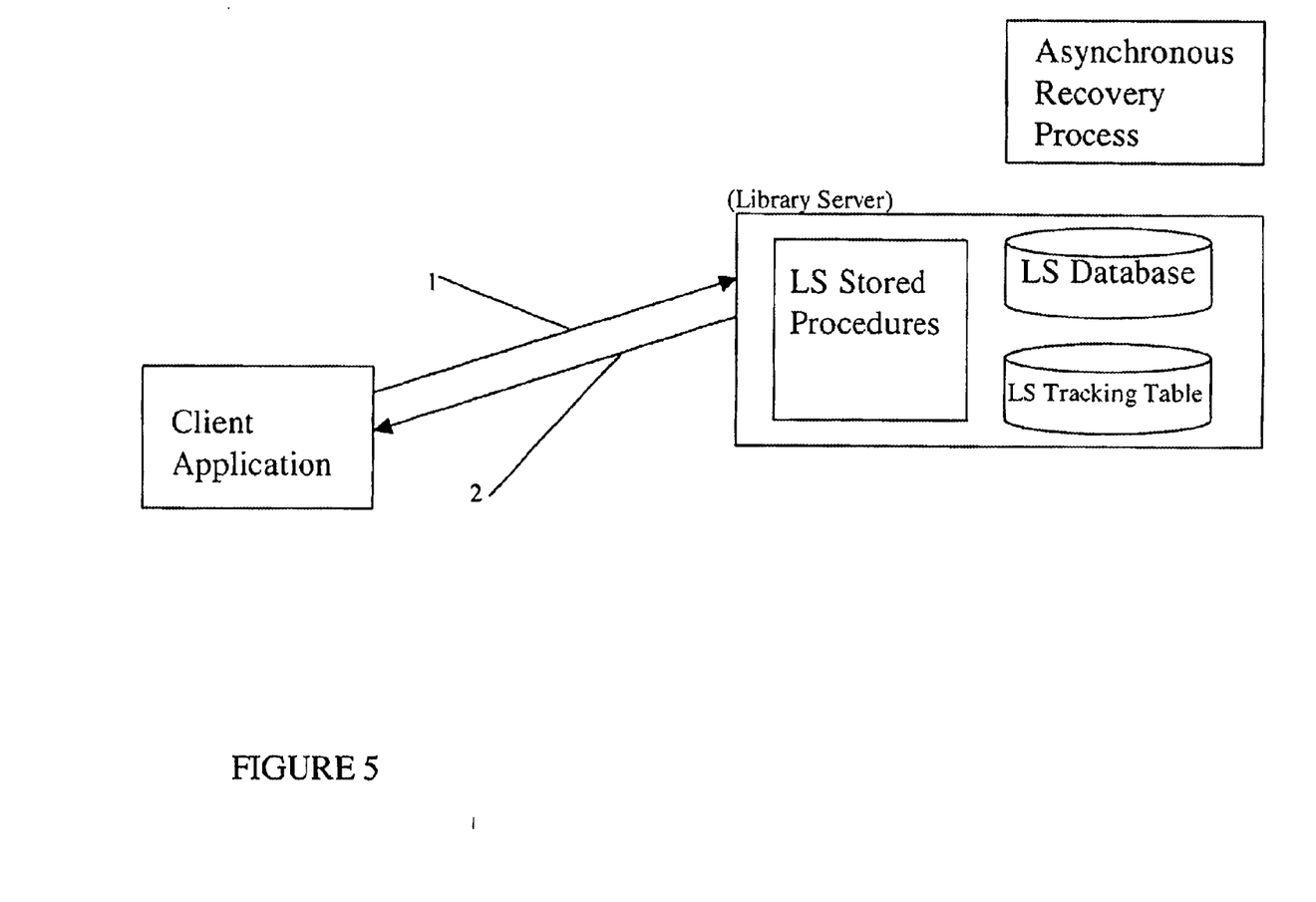
FIG. 5 illustrates the communication pathways for deleting an object.

The Delete Reconciliation Communication Flow is as shown in the FIG. 5 and shown below:

1. The resource manager (RM) reconciliation executable requests the "to be deleted" requests via a SP to the LS
2. library server (LS) SP reads the "To Be Deleted Items" table, and builds reply to the Resource Manager.

The library server (LS) SP returns a list of objects to be deleted. The resource manager (RM) executable goes through the returned list, deletes the objects, and commits. The resource manager (RM) executable will issue a library server (LS) SP to remove the specified objects from the "To be deleted" table. The library server (LS) SP removes the records and commits. If a record does not exist, already, it is ignored. The SP returns a successful return code or a DB error.

Resource Manager Transaction Reconciliation Communication Flow shown in FIG. 1 for replacing an item is as follows:

1. The client first invokes the Begin transaction API to indicate the start of the transaction. Begin transaction sets a transaction flag in the data structure, and sets Transaction ID=null. (No call to the Library Server is made here.)
2. Begin transaction returns to the caller.
3. The client establishes a connection with the library server (LS) via the Update Item, Get Item, (with check-out specified) or the Check Out Item APIs. The item is marked as "checked out". The stored procedure invokes the Generate Token( ) function to obtain tokens for each resource item. An access token is generated for each item. In addition, if this is the first call to Create item since the start of the transaction (i.e., if TrxID=null and the sTran flag is on), the stored procedure will generate a transaction ID, insert a record for this transaction ID into the library server (LS) tracking table.
4. The library server (LS) returns the tokens, resource manager (RM) host names, port numbers, collection names, and transaction ID to the client. The API will store the transaction ID in the data structure.
5. The client establishes a connection with the Resource Manager (RM) via the Replace object API. The HTTP protocol is used to transmit the object token, collection name, information about the object, transaction ID and the object itself (one at a time). The resource manager (RM) HTTP Server receives the request, and invokes the resource manager (RM) Replace Agent program which validates the token using the Validate token( ) function, replaces the object (actually storing the replaced object under a different object name, leaving the old version of the alone for roll-back purposes), inserts a "post replace" record in the resource manager (RM) Tracking Table (TT), and then commits all updates. For LBOS, a "pre store" replace record is first inserted into the Tracking Table and committed, before the new object is stored and hardened, but after the space has been allocated for it. This is then followed by changing the "pre replace" record to a "post replace" record and committing the update. If an earlier replace was performed in this transaction for the same object, the "middle" object (new object from the earlier replace) and its transaction table record can both be deleted, saving only the oldest object and the newest.
6. The resource manager (RM) returns to the client, indicating the success or failure of its updates. It also returns the object meta data to the client. Steps 5 and 6 are repeated until all objects are replaced. Replace object will maintain the object's meta data in memory (to be updated in step 7 via the Update item API).
7. The client invokes the End transaction API to commit its updates. End transaction will first call the Update object data stored procedure to store the object meta data. This stored procedure is also responsible for updating the library server (LS) Tracking Table record for this transaction ID with the list of Resource Managers which were contacted during the transaction. This information will be used later by the Asynchronous Recovery Process to synchronize library server (LS) and resource manager (RM) updates. Before calling Update object data, the End transaction API must get the metadata from API cache, and verify it with the accompanying encrypted checksum. If it cannot be verified, it will return a bad return code to the caller. Update object data also performs a RDBM commit of the library server (LS) updates.
8. Update object data returns to the End transaction API, indicating the success/failure of the metadata updates.
9. The End transaction API will start a new thread to delete all resource manager (RM) tracking table records for the transaction ID (i.e., it happens asynchronously). The resource manager (RM) commits the deletes. If this asynchronous cleanup failed, the AR process will redo the cleanup. (This asynch cleanup initiated by End transaction aims to keep the size of resource manager (RM) Tracking Table small and to reduce AR workload.) Finally, the End transaction API deletes all transaction-specific info from the API cache before returning to the application.
10. The resource manager (RM) returns after deleting tracking table records for the transaction ID. (Client does not need to wait for return)
11. The Asynchronous Recovery (AR) Process is run as a separate batch process. It will recognize when a transaction has aborted, and take corrective action depending upon the point of failure.

Points of Failure:

ReplaceObject #1—If a failure occurs after the library server (LS) commit in step 3, but prior to the resource manager (RM) commit in step 5, a condition will exist where an item has been checked-out in the library server (LS) database by the Get Item API, but for which no replace was done by the RM. The AR cannot assume a failure has occurred in this scenario. The client application may still be in the process of modifying the object, and may not be ready to replace the object yet. Therefore, the AR can take no action except to write a message to the log indicating that this condition exists.

ReplaceObject #2—If a failure occurs after the resource manager (RM) commit in step 5, but prior to the library server (LS) commit in step 7, a condition will exist where the object has been replaced by the RM, but the LS's meta data does not reflect the update. The AR will find an resource manager (RM) tracking table "post replace" record(s), but no corresponding library server (LS) tracking table record. Using the timestamp of the resource manager (RM) tracking table record, it will determine a failure has occurred. It will roll-back the resource manager (RM) replace using the data in the resource manager (RM) tracking table record and the saved old object. It will write a message to the log indicating it took this action.

ReplaceObject #3—If a failure occurs after the library server (LS) commit in step 7, but before the resource manager (RM) tracking table records are deleted/committed in step 9, a condition will exist where the library server (LS) meta data has been updated and committed, an library server (LS) tracking table record exists, the object has been replaced, the item is checked back in, and the resource manager (RM) tracking table record still shows the replace is in progress. The AR will assume a failure has occurred based upon the time which has passed since the resource manager (RM) tracking table record's timestamp. In this case, the AR will see leave the library server (LS) meta data as is, and delete the resource manager (RM) tracking table records, and the saved old objects. It will write a message to the log indicating it took this action.

Client-initiated Rollbacks

The points above address out-of-synch conditions occurring as the result of an aborted transaction. The client may initiate a roll-back using the End transaction API (step 7). In this case, End transaction will not call Update item to update the library server (LS) meta data. Since the item check-out has already been committed (step 3), it will not roll back that update. Resource manager updates have also been committed, and will be rolled-back later by the AR process when it finds resource manager (RM) tracking table records for this replace.

Figure 6:
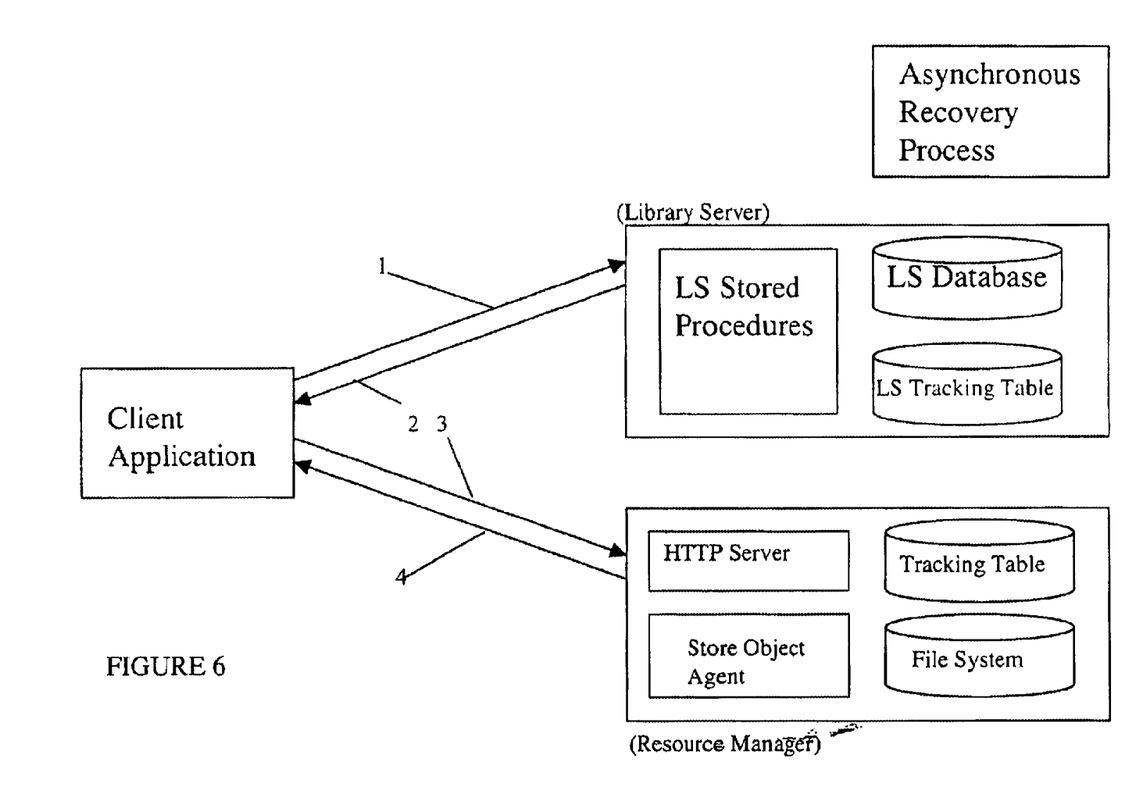
FIG. 6 illustrates the communications pathways for retrieving an object.

A client application which includes library server (LS) and resource manager (RM) for updates and/or retrievals for an item/object pair in the same transaction is illustrated in FIG. 6. It will invoke APIs in the following order:

1. The Client invokes a connect API to perform a connection to the DB2 database where the library server (LS) stored procedures reside.
2. The Client invokes a logon API to obtain a user token before calling any other APIs.
3. The Client next invokes a begin transaction API to indicate this is the start of the transaction, and that all updates performed from here on (prior to the end of transaction call) must be committed or rolled-back together. At this time, a transaction flag is set in the client's connection structure indicating a transaction is begun.
4. The Client invokes the appropriate library server (LS) API obtain an object access security token, and possibly to perform library server (LS) updates related to the object.
   A. When storing an object (or new version of an object), a create item API is called.
   B. When replacing an object or updating its SMS information, typically either an update item API or a get item API, or a checkout item API will be called. (All three can lock the item in the library server (LS) from further updates until the locking client releases it.)
   C. When retrieving an object or its SMS information, typically a get item API is called, but the client may also use the token from a checkout item API or an update item API call as well.

In steps 4A through 4C above, the API will pass both a transaction flag (set in step 3 above) and a transaction id as input parameters. If a transaction id has not yet been generated, and the transaction flag is on, the SP invoked by the API will utilize a relational database management system (RDBMS) facility for getting the current timestamp (no table access is done). The current timestamp may be used as the transaction id, and will be returned to the calling application.

Also in steps 4A through 4C above, if a transaction id was generated in the call to the SP, the SP will also write a record to the library server (LS) Tracking Table with a status of in progress 5. The Client invokes the appropriate resource manager (RM) API to perform an action on an object.
   A. When storing an object (brand new or new version of an existing object), a store object API is called.
   B. When replacing an object, a replace object API will be called.
   C. When updating an object's SMS information, a change SMS Information API will be called.
   D. When retrieving an object (or part of an object), a retrieve object API is called.
   E. When retrieving an object's SMS information, a query SMS information API is called.

In steps 5A through 5C above, the resource manager (RM) will write a record to the resource manager (RM) Tracking Table. (See the resource manager (RM) Tracking Table layout in section 4.0.2 below.)

Also in steps 5A through 5C, the object's meta data (as well as data about the resource manager (RM) being accessed) will be stored in memory within the API.

In steps 5A through 5E above, the resource manager (RM) will validate the security token obtained in step 4 to ensure that the right object is being acted upon by the right client, and within the allotted time limit.

6. The Client invokes an end transaction APL indicating the transaction should either be committed or rolled back.

The end transaction API first obtains the object meta data from API cache, and verifies that it has not been corrupted. If OK, it will call stored procedure update object to update the meta data in the library server (LS) database for the object(s) which were stored, replaced or had their SMS information changed during this transaction. The SP will also update the tracking table row for this transaction id, indicating that it has been committed, and which resource manager (RM)s were included in the transaction. An update object data API also performs a DBMS commit before returning to an end transaction API.

The end transaction API will then send a separate "end tran" request to each of the resource manager (RM)'s indicating that the resource manager (RM) Tracking Table records for this transaction id are to be deleted. The end transaction starts a separate thread to do this asynchronously, and does not wait for a return from the resource manager (RM) s.

We return to FIG. 1 to more carefully illustrated the communication path for storing an object.

1. The client first invokes the begin transaction command API to indicate the start of the transaction, begin transaction command sets a transaction flag in the appropriate data structure, and sets the transaction ID to null.
2. The begin tran then returns to the caller.
3. The client establishes a connection with the library server (LS) via a "create item" API to insert information for one or more items. An access token is generated for each object to be stored. In addition, if this is the first call to create item since the start of the transaction, the stored procedure will generate a transaction ID, and insert a record for this transaction ID into the library server (LS) tracking table. The client knows whether a transaction has started and whether a transaction ID has been generated. If the transaction ID is null while a transaction has started, it will piggyback a request to generate a transaction ID on the next visit to the library server (LS). Additionally, the call by the client will insert a placeholder for the item to be inserted, set a "transaction in progress" flag, and commit the insertion of the placeholder through a stored procedure in the library server 4. The library server (LS) returns the tokens, resource manager (RM) host names, port numbers, collection names, and transaction ID to the client. The API will store the transaction ID in the data structure.
5. The client establishes a connection with the Resource Manager (RM) via the store object API. The HTTP protocol is used to transmit the object token, collection name, information about the object, transaction ID and the object itself (one at a time). The resource manager (RM) HTTP Server receives the request, and invokes the resource manager (RM) Store agent program which validates the token using a Validate token function, generates a permanent object ID, stores the object, inserts a "post store" record in the resource manager (RM) Tracking Table, and then commits all updates. For LBOS, a "pre store" record is first inserted into the Tracking Table and committed, before the object is stored and hardened, but after the space has been allocated. This is then followed by changing the "pre store" record to a "post store" record and committing the update.
6. The resource manager (RM) returns to the client, indicating the success or failure of its updates. It also returns the object meta data to the client. The meta data includes permanent object ID, timestamp, object size, and possibly other system attributes that are resource type-specific. Steps 5 and 6 are repeated until all objects are stored. The store object API will maintain the object's meta data in memory (to be updated later via the update item API). Upon receiving the object meta data, the API creates (on-the-fly) a checksum and also encrypts it. The metadata and encrypted checksum along with resource manager (RM) hostname are stored in the API cache. A list of resource manager (RM)'s that have been updated by the current transaction is maintained in the API cache. When resource manager (RM) returns after storing an object, the API makes sure this resource manager (RM) is included in the list. The client invokes the end transaction to commit its updates. The end transaction API will first call the update object data procedure to store the object meta data. This stored procedure is also responsible for updating the library server (LS) Tracking Table record for this transaction ID with the list of Resource Managers which were contacted during the transaction. This information will be used later by the Asynchronous Recovery Process to synchronize library server (LS) and resource manager (RM) updates. Before calling update object data, the end transaction API must get the metadata from API cache, and verify it with the accompanying encrypted checksum. If it cannot be verified, it will return a bad return code to the caller. The update object data also performs a DB2 commit of the library server (LS) updates.
7. The Update object data function stored procedure updates the metadata and populates all of the other rows involved in the transaction (except for the placeholder) returns to the End transaction API, indicating the success or failure of the meta data update. This SP also returns commit tokens for each resource manager (RM) involved in the transaction.
8. The End transaction API will start a new thread to delete all resource manager (RM) tracking table records for the transaction ID (i.e., it happens asynchronously). The resource manager (RM) commits the deletes. If this asynchronous cleanup failed, the asynchronous recovery (AR) process will redo the cleanup. (This asynch cleanup initiated by End transaction aims to keep the size of resource manager (RM) Tracking Table small and to reduce asynchronous recovery (AR) workload.) Finally, the End transaction API deletes all transaction-specific info from the API cache before returning to the application.
9. The resource manager (RM) returns after deleting tracking table records for the tran ID. (Client does not need to wait for return)
10. The Asynchronous Recovery (AR) Process is run as a separate batch process. It will recognize when a transaction has aborted, and take corrective action depending upon the point of failure.

Points of Failure:

Commits are performed in three steps in the path above; in step 5 after the object has been stored by the resource manager (RM), in step 9 after the library server (LS) meta data update (stored procedure update object data, which is called by end transaction), and in step 10 after the resource manager (RM) deletes the tracking table records for the transaction. Failures may occur before or after each of these commit points.

StoreObject #1—If a failure occurs prior to step 5, any library server (LS) database updates which might have been performed (if the transaction got past step 3) will be rolled-back. No resource manager (RM) updates will have occurred either. No action is necessary by the AR.

StoreObject #2—If a failure occurs after an object(s) has been stored and committed in step 5, but prior to the commit of the library server (LS) meta data update in step 9, a condition will exist where an object (and its corresponding tracking table record) have no corresponding library server (LS) item (i.e., an "orphaned object"). The asynchronous recovery (AR) will find the resource manager (RM) tracking table record and no corresponding library server (LS) tracking table record. It will assume the transaction aborted if a TBD amount of time has passed since the resource manager (RM) tracking table record was written, and will roll-back the store, deleting both the object and the resource manager (RM) tracking table record.

StoreObject #3—If a failure occurs after the commit in step 9, but prior to the commit in step 10, the asynchronous recovery (AR) will find both an library server (LS) tracking table record and a corresponding resource manager (RM) tracking table record(s). It will delete the resource manager (RM) tracking table record.

Client-Initiated Rollbacks

The points above address out-of-synch conditions occurring as the result of an aborted transaction. The client may initiate a roll-back using the end transaction API (step 7). In this case, end transaction will not call the update item API to update the library server (LS) meta data. It will immediately roll-back updates performed in step 3 with Create Item API. The Resource Manager store object action will be rolled-back later by the AR.

Client-initiated Rollbacks

The points above address out-of-synch conditions occurring as the result of an aborted transaction. The client may initiate a roll-back using the End Transaction API (step 7). In this case, End Transaction will not call Update Item to update the library server (LS) meta data. Since the item check-out has already been committed (step 3), it will not roll back that update. Resource manager updates have also been committed, and will be rolled-back later by the asynchronous recovery (AR) process when it finds resource manager (RM) tracking table records for this replace.

A further aspect of our invention is a program product. A program product is computer readable program code on one or more media, said program code being capable of controlling and configuring a computer system having one or more computers. The one or more computers may be configured and controlled to carry out the method described herein. Alternatively, the program may be one or more of encrypted or compressed for subsequent installation, and may be resident on media or on an installation server.

While our invention has been described with respect to certain preferred embodiments and exemplifications, it is not intended to be limited thereby, but solely by the claims appended hereto.

We claim:

1. A method of managing a content management system, said content management system being configured and controlled to begin a transaction and create an item at a client, establish a connection between the client and a library server, generate a transaction identifier and insert a record for the transaction in a tracking table associated with the library server, pass transaction data from the client to a resource manager, process the transaction at the resource manager and record transaction data in a tracking table associated with the resource manager, return transaction success/failure data to the client, compare activity recorded in the tracking tables, and take corrective action based upon the activity comparison.

2. The method of claim 1 wherein an object and its corresponding resource manager tracking table record have no corresponding library server item, said method further comprising rolling back the resource manager store, deleting both the object and the resource manager tracking table record.

3. A method of managing a content management system, said content management system being configured and controlled to establish a connection between the client and a library server, generate a transaction identifier and check out an item, insert a record for the transaction in a tracking table associated with the library server, pass transaction data from the client to a resource manager, process the transaction at the resource manager, transfer the requested item to the client, processing the requested item at the client and returning the item to the resource manager, record transaction data in a tracking table associated with the resource manager, and return transaction success/failure data to the client, compare activity recorded in the tracking tables, and take corrective action based upon the activity comparison.

4. The method of claim 3 wherein the processing of the requested item is not committed to the resource server, comprising rolling-back resource manager entries.

5. The method of claim 3 wherein processing of the requested item is committed to the resource server but before resource manager records are updated wherein library server records have been updated and committed, the requested item has been replaced at the resource server, but the resource manager tracking table shows the replace is in progress, further leaving updated LS meta data as is, and deleting the resource tracking table records.

6. A content management system, said content management system being configured and controlled to begin a transaction and create an item at a client, establish a connection between the client and a library server, generate a transaction identifier and insert a record for the transaction in a tracking table associated with the library server, pass transaction data from the client to a resource manager, process the transaction at the resource manager and record transaction data in a tracking table associated with the resource manager, and return transaction success/failure data to the client, compare activity recorded in the tracking tables, and take corrective action based upon the activity comparison.

7. The content management system of claim 6 wherein an object and its corresponding resource manager tracking table record have no corresponding library server item, said method further comprising rolling back the resource manager store, deleting both the object and the resource manager tracking table record.

8. A content management system, said content management system being configured and controlled to establish a connection between the client and a library server, generate a transaction identifier and check out an item, insert a record for the transaction in a tracking table associated with the library server, pass transaction data from the client to a resource manager, process the transaction at the resource manager, transfer the requested item to the client, processing the requested item at the client and returning the item to the resource manager, record transaction data in a tracking table associated with the resource manager, and return transaction success/failure data to the client, compare activity recorded in the tracking tables, and take corrective action based upon the activity comparison.

9. The content management system of claim 8 wherein the processing of the requested item is not committed to the resource server, comprising rolling-back resource manager entries.

10. The content management system of claim 8 wherein processing of the requested item is committed to the resource server but before resource manager records are updated wherein library server records have been updated and committed, the requested item has been replaced at the resource server, but the resource manager tracking table shows the replace is in progress, further leaving updated LS meta data as is, and deleting the resource tracking table records.

11. A program product comprising a media having computer readable code for of managing a content management system, said content management system being configured and controlled to begin a transaction and create an item at a client, establish a connection between the client and a library server, generate a transaction identifier and insert a record for the transaction in a tracking table associated with the library server, pass transaction data from the client to a resource manager, process the transaction at the resource manager and record transaction data in a tracking table associated with the resource manager, and return transaction success/failure data to the client, compare activity recorded in the tracking tables, and take corrective action based upon the activity comparison.

12. The program product of claim 11 wherein an object and its corresponding resource manager tracking table record have no corresponding library server item, said method further comprising rolling back the resource manager store, deleting both the object and the resource manager tracking table record.

13. A program product comprising a media having computer readable code for of managing a content management system, said content management system being configured and controlled to establish a connection between the client and a library server, generate a transaction identifier and check out an item, insert a record for the transaction in a tracking table associated with the library server, pass transaction data from the client to a resource manager, process the transaction at the resource manager, transfer the requested item to the client, processing the requested item at the client and returning the item to the resource manager, record transaction data in a tracking table associated with the resource manager, and return transaction success/failure data to the client, compare activity recorded in the tracking tables, and take corrective action based upon the activity comparison.

14. The program product of claim 13 wherein the processing of the requested item is not committed to the resource server, comprising rolling-back resource manager entries.

15. The program product of claim 13 wherein processing of the requested item is committed to the resource server but before resource manager records are updated wherein library server records have been updated and committed, the requested item has been replaced at the resource server, but the resource manager tracking table shows the replace is in progress, further leaving updated LS meta data as is, and deleting the resource tracking table records.

* * * * *